DANIEL BEST.
Improvement in Grain-Separators.

No. 114,097.  Patented April 25, 1871.

Witnesses.
Geo. H. Strong
Wm. H. Runnels

Inventor.
Daniel Best
By his Atty's
Dewey & Co.

United States Patent Office.

DANIEL BEST, OF YUBA, CALIFORNIA.

Letters Patent No. 114,097, dated April 25, 1871.

IMPROVEMENT IN GRAIN-SEPARATORS.

The Schedule referred to in these Letters Patent and making part of the same.

*To all whom it may concern:*

Be it known that I, DANIEL BEST, of the city and county of Yuba, State of California, have invented an "Improved Portable Grain-Separator;" and I do hereby declare the following description and accompanying drawing are sufficient to enable any person skilled in the art or science to which it most nearly appertains to make and use my said invention or improvements without further invention or experiment.

The object of my invention is to provide an improvement in grain-separators; and It consists, first, in the employment of a series of peculiarly-shaped screens for the purpose of separating and cleaning the different qualities of grain. These screens are all held in the same frame, and receive a side shaking motion all at once.

It also relates to the use of feeding and returning-elevators by which the grain can be fed to the hopper with very little labor, and by which the grain can be returned to the hopper, if desired, for a second cleaning.

The discharge-spout for the second quality of grain is so arranged that it will either discharge the grain immediately, or will allow it to pass to the returning-elevator if it be found not clean enough.

The first quality of grain is allowed to fall upon a screen which has a peculiar tossing motion, and which throws it into the discharge-spout; or, by reversing the movement of its driving-pulley, the grain can be kept in the screen as long as desired, or until it is perfectly cleaned.

A set of angular plates is introduced between the screens, and by its action and the shape of the screens, the blast is directed upward instead of backward.

Referring to the accompanying drawing for a more complete explanation of my invention—

Figure 1:
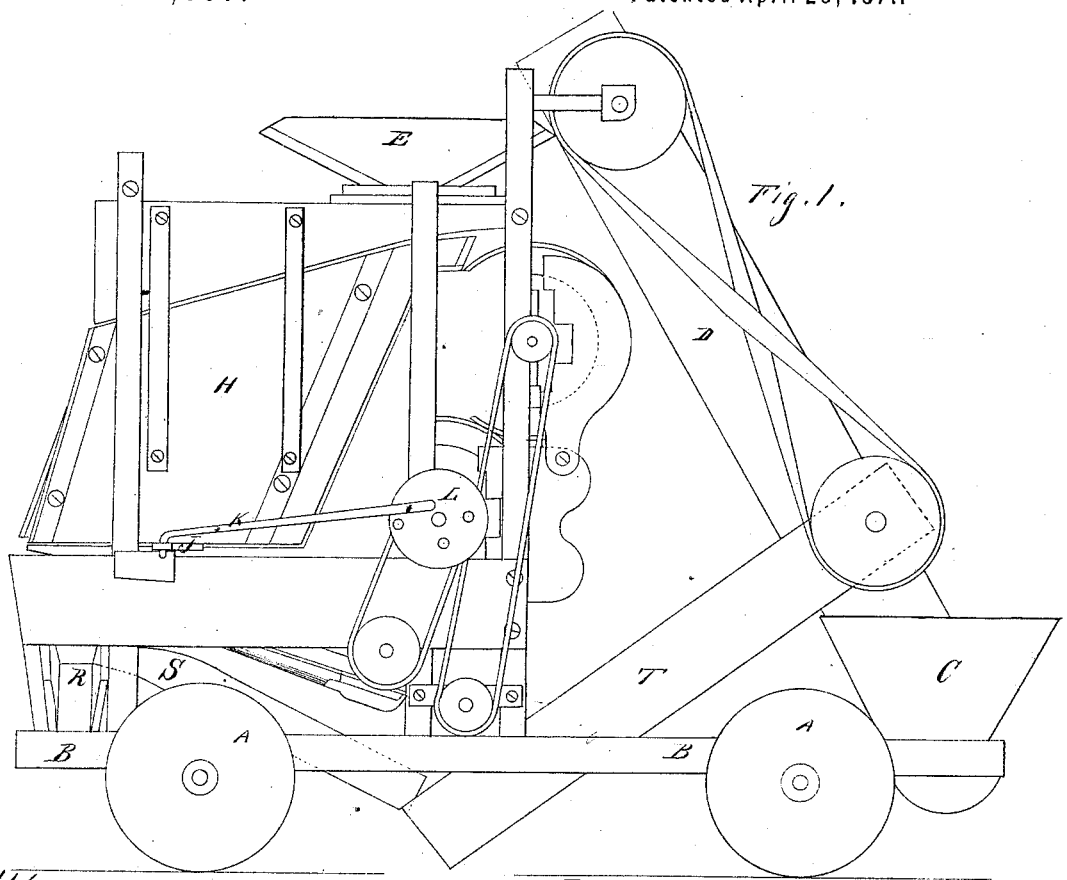
Figure 1 is a side elevation.
Figure 2:
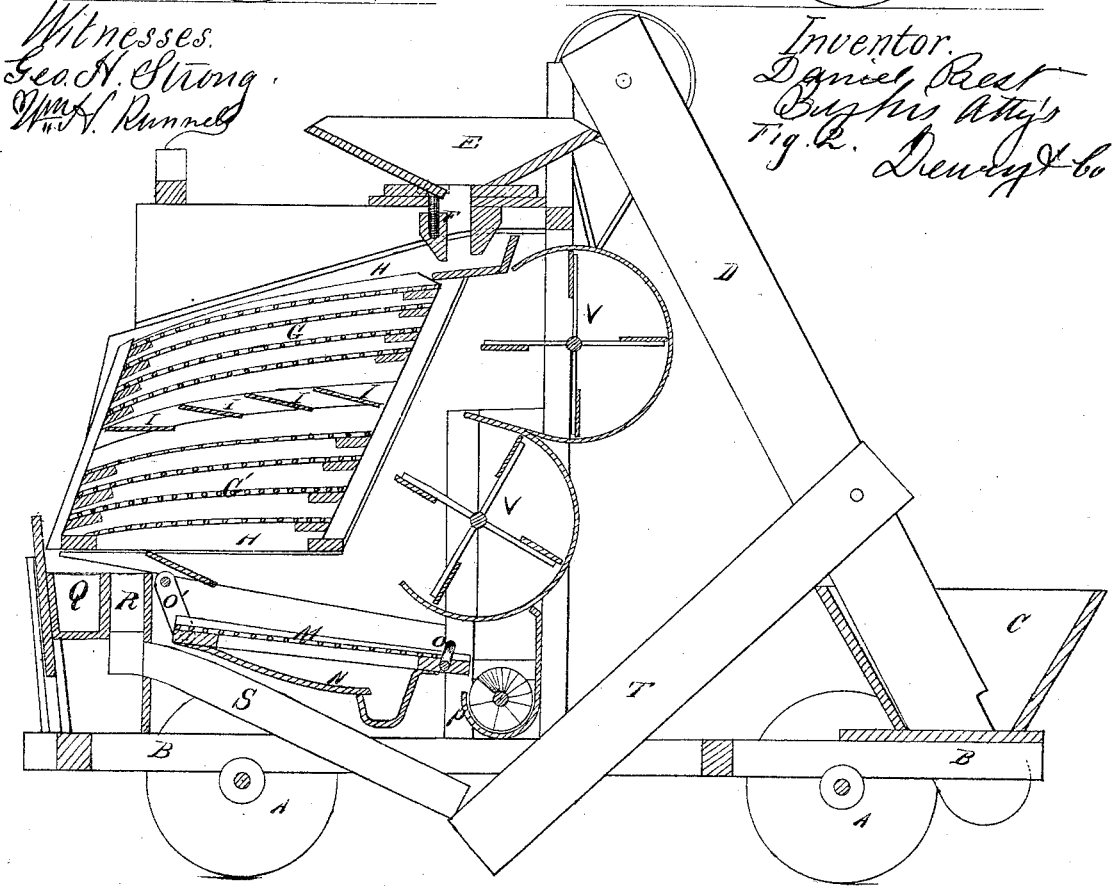
Figure 2 is a vertical section.

A A are wheels which support the frame B, and upon this frame the machine is constructed so that it is easily moved from place to place.

At one end of the frame I place a hopper or receiver, C, which is low, so that the grain can be easily discharged into it.

An elevator, D, takes the grain from this hopper and carries it up to the upper hopper E. From this hopper the grain passes to the cleaning apparatus, its discharge being regulated by an adjustable gate or valve, F.

The cleaning-screens G G' are all secured in one frame, H, in two sets, and may be as numerous as desirable.

The two sets of screens are separated by a riddle consisting of a series of vanes, I, which stand at an angle, as shown, and by their action direct the wind from the fans forward and upward to the upper series of screens, and also direct the clean grain downward and backward to the lowermost screen.

The frame H, which contains the screens and riddle, has a side shaking motion given to it by means of the bell-crank J, connecting-rod K, and crank or eccentric-wheel L, so that all the screens have the same motion. The screens are given a peculiar downward curve near their rear end, so as to facilitate the discharge of the grain after it has passed beyond the reach of the blast.

The lowest screen, M, upon which the good wheat finally falls, is sufficiently fine to retain the wheat, but allows the cheat, mustard, &c., to fall through into a pan, N, which collects them and finally discharges them into a receptacle at one side.

The screen M is entirely separate from the upper set of screens G, and has a peculiar tossing motion given it in the following manner:

The lower end next to the discharge-spout is hung upon short cranks o, the shaft of which is revolved by a pulley.

The upper end of the screen is suspended by short links o', which simply swing forward and backward. The motion thus given is a peculiar toss, which throws the grain up from the screen and allows a thorough separation from the small grain. The wheat is at the same time advanced, and is finally thrown into the discharge-spout p, from which it is delivered at one end by a screw.

At the rear of the screens G are two inclined discharge-spouts, Q and R. The barley and light grain are carried into the spout Q and discharged at one side. The wheat falls through the first set of screens and the riddle I to the second set. The good wheat passes through this set, also, as above described.

The second quality of grain will be carried over the rear edge of the screens and will fall into the spout R, from which it will be discharged at the side; or, if it be desired to give it a further cleaning, a gate near the center of the spout R is closed, and the grain is directed into a spout, S, which discharges it into the elevator T. This elevator discharges the grain into the hopper C, from which it again passes through the screens, as described.

The fans V V revolve, and are protected in such a manner that the blast is thrown up, instead of backward, through the screens. By the shape of the screens and the riddle I, the effect of the blast does not extend beyond the point where the screens begin to curve downward, and this allows the chaff to glide off more slowly at the last, as not to carry any grain over with it by a rapid motion.

Having thus described my invention,

What I claim, and desire to secure by Letters Patent, is—

1. The grain-separator herein described, consisting principally of the hoppers C and E, elevators D and T, curved screens G and G', screen M, fans V, spouts R and S, and the riddles I, all constructed and arranged to operate substantially as and for the purpose set forth.

2. The combination and arrangement of the double set of curved screens G and G', fans V V, and the riddles I, all constructed as described, and operating substantially as and for the purpose specified.

In witness whereof I have hereunto set my hand and seal.

DANIEL BEST. [L. S.]

Witnesses:
JONAS MARCUS,
JACOB B. CLARK.